US010975262B1

(12) United States Patent
Dave et al.

(10) Patent No.: US 10,975,262 B1
(45) Date of Patent: Apr. 13, 2021

(54) WRITABLE, DRY ERASABLE PAINTS WITH SELECTED SURFACTANTS

(71) Applicant: Columbia Insurance Company, Omaha, NE (US)

(72) Inventors: Dilip Indravadan Dave, Budd Lake, NJ (US); Jessica Riedmueller, Greenwood Lake, NY (US); John Minerowicz, Califon, NJ (US); DonnaLynn Panila, Pine Brook, NJ (US)

(73) Assignee: Columbia Insurance Company, Omaha, NE (US)

(*) Notice: Subject to any disclaimer, the term of this patent is extended or adjusted under 35 U.S.C. 154(b) by 0 days.

(21) Appl. No.: 16/011,881

(22) Filed: Jun. 19, 2018

Related U.S. Application Data

(60) Provisional application No. 62/544,072, filed on Aug. 11, 2017.

(51) Int. Cl.

| | | |
|---|---|---|
| *C09D 163/00* | (2006.01) | |
| *C09D 7/65* | (2018.01) | |
| *C09D 7/63* | (2018.01) | |
| *C08K 5/101* | (2006.01) | |
| *C08L 83/04* | (2006.01) | |
| *C08K 5/544* | (2006.01) | |

(52) U.S. Cl.
CPC .......... *C09D 163/00* (2013.01); *C09D 7/63* (2018.01); *C09D 7/65* (2018.01); *C08K 5/101* (2013.01); *C08K 5/544* (2013.01); *C08L 83/04* (2013.01)

(58) Field of Classification Search
CPC .......... C09D 163/00; C09D 7/65; C09D 7/63; C08K 5/101; C08K 5/544; C08L 83/04
USPC ....................................................... 523/461
See application file for complete search history.

(56) References Cited

U.S. PATENT DOCUMENTS

| | | | |
|---|---|---|---|
| 3,647,728 A | 3/1972 | Deflorin et al. | |
| 5,618,860 A | 4/1997 | Mowrer et al. | |
| 6,031,023 A * | 2/2000 | Carroll ................. | C09D 11/17 523/161 |
| 6,132,808 A | 10/2000 | Brown | |
| 8,309,653 B2 | 11/2012 | Goscha et al. | |
| 8,686,091 B2 | 4/2014 | Goscha et al. | |
| 9,056,519 B2 | 6/2015 | Goscha et al. | |
| 9,227,459 B2 | 1/2016 | Goscha et al. | |
| 2007/0010148 A1 * | 1/2007 | Shaffer ................. | D04B 1/00 442/59 |
| 2007/0149667 A1 * | 6/2007 | Xu ........................ | B33Y 70/00 524/360 |
| 2011/0086174 A1 * | 4/2011 | Lee ..................... | C04B 41/4853 427/407.1 |
| 2011/0300294 A1 | 12/2011 | Nachtman et al. | |
| 2013/0029311 A1 * | 1/2013 | Goscha ............... | C09D 183/06 434/408 |
| 2014/0073720 A1 * | 3/2014 | Geismann ............ | C09J 163/00 523/435 |
| 2014/0272155 A1 | 9/2014 | Kramer et al. | |
| 2015/0018455 A1 | 1/2015 | Nachtman et al. | |
| 2015/0184021 A1 | 7/2015 | Nachtman et al. | |
| 2015/0259559 A1 * | 9/2015 | Petrie .................. | C09D 133/00 427/385.5 |
| 2015/0344732 A1 * | 12/2015 | Witt-Sanson ........ | C09D 179/08 428/35.8 |

FOREIGN PATENT DOCUMENTS

| | | | | |
|---|---|---|---|---|
| CN | 101358101 A | * | 2/2009 | ........... C09D 133/00 |
| CN | 104845491 A | * | 8/2015 | ............... C08K 3/04 |
| JP | 2008208273 A | * | 9/2008 | ........... C09D 133/26 |

OTHER PUBLICATIONS

He et al., CN 101358101 A machine translation in English, Feb. 4, 2009 (Year: 2009).*
Inada et al., JP 2008-208273 A machine translation in English, Sep. 11, 2008 (Year: 2008).*
Li et al., CN 104845491 A machine translation in English, Aug. 19, 2015 (Year: 2015).*
Kovalchuk et al. "Fluoro- vs hydrocarbon surfactants: Why do they differ in wetting performance?" Advances in Colloid and Interface Science 210. Elsevier. 2014. 65-71.
Moulik et al. "Gemini Surfactants: A Distinct Class of Self-Assembling Molecules." Current Science, vol. 82, No. 9. May 10, 2002.
Epoxy Research Resin RSL-4479. Hexion Technical Data Sheet. Sep. 2014. p. 1-4.
"High-Solids 2-Pack Silicone-Epoxy Resin." Manual Silikopon EF. Evonik Industries AG. Sep. 2013. pp. 1-3.
Hait et al. "Gemini surfactants: A distinct class of self-assembling molecules." Current Science, vol. 82, No. 9, May 10, 2002.

* cited by examiner

*Primary Examiner* — David T Karst
(74) *Attorney, Agent, or Firm* — The H.T. Than Law Group

(57) ABSTRACT

Disclosed herein are writable, dry erasable two-part paint compositions that have an epoxy resin part and an aminosilane part, as well as a fluoro surfactant and a Gemini surfactant. The paint compositions have an amino to epoxy equivalent weight ratio from about 0.30 to about 0.65. Dry films formed from these paint compositions have relatively short dry time and markings on the dry films can be dry erased up to 33 days and beyond.

16 Claims, No Drawings

WRITABLE, DRY ERASABLE PAINTS WITH SELECTED SURFACTANTS

FIELD OF THE INVENTION

This invention generally relates to paint compositions that are applied to substrates, such as walls, and the dried films can be used as an erasable writing surface and can be written on with dry erasable markers and the markings are erasable with a dry or wet cloth.

BACKGROUND OF THE INVENTION

Writable, dry erasable paint compositions seek to replace conventional erasable writing surfaces, such as white boards, where dry erasable markers can be written on the erasable writing surfaces and thereafter the markings can be wiped off the erasable writing surfaces with a cloth or a dry eraser. These writable, dry erasable paint compositions can be clear coatings that cover a substrate or wall that had been previously painted, or they can include opacifying pigments to cover a substrate or wall as a white or colored coating and hide the underlying surface. Clear compositions maintain the color of a wall, which may be desirable by the consumers.

Existing writable, dry erasable coatings may take a long time to dry or their dry coating may turn yellow after exposure to the environment. Additionally, some compositions when applied with a roller applicator leave small bubbles on the substrate, thereby making the dry surface less smooth and less amenable to being written on. Some compositions also contain isocyanates, which are undesirable in a consumer product.

U.S. patent application publication nos. 2015/0018455 and 2015/0184021 disclose writeable, dry erasable paint compositions. These compositions are two-part paint compositions and comprise a resin part, which includes an epoxy, a polysiloxane and an organooxysilane, and a cure part, which comprises one or more amino-silanes. When the two parts are mixed, the amino to epoxy equivalent weight ratio is in the range of 1.0 to 5.0.

U.S. Pat. No. 5,618,860 to Mowrer was discussed in the '455 and '201 publications for the teaching of epoxide equivalent weight and amino to epoxy equivalent weight ratios. The Mowrer reference discloses a paint composition that uses an epoxide resin part having more than one 1,2-epoxy group per molecule with an epoxide equivalent weight in the range from 100 to 2,000, and an aminosilane cure part. This two-part paint composition has an amine to epoxy equivalent weight ratio from 0.7 to 1.2.

These references are incorporated herein by reference in their entireties.

Other two-part epoxy-amine paint compositions have an amine to epoxy equivalent weight ratio as low as 0.20.

These conventional two-part compositions can exhibit long drying time and/or produce textured dried surfaces caused by bubbles. Removing dried inks from these paint films can be difficult after two or three days. Some compositions may also experience yellowing with time. Hence, there remains a need for writable, dry erasable paint compositions that avoid these drawbacks.

SUMMARY OF THE INVENTION

Hence, the invention is directed to an improved paint composition comprising an epoxy resin part, a cure part comprising at least an aminosilane, and a plurality of selected surfactants. These two parts and the selected surfactants are admixed to form a writable, dry erasable paint composition. The present inventors have discovered that a combination of a fluoro surfactant and a gemini surfactant in the inventive paint composition improves the releasability of dried inks deposited on the paint film even after three days. The inventive paint composition preferably has an amine to epoxy equivalent weight ratio from about 0.30 and about 0.65.

DETAILED DESCRIPTION OF THE PREFERRED EMBODIMENTS

The present inventors have discovered writable, dry-erasable two-part paint compositions that have sufficiently short dry time that exhibit properties similar to those of conventional erasable writing surfaces, such as white boards. The properties include but are not limited allowing dry erasable markers to write on the dried films and be erased using a dry eraser or dry rag or towel after a number of days, discussed below. The markings can also be erased using a wet rag or towel. These properties further include but are not limited to the abilities to withstand or pass standard scrub tests and adhesion tests.

The inventive paint compositions comprise a number of improvements over the conventional paint compositions of an epoxy resin part and a cure part. The present inventors have discovered that a combination of selected surfactants improves the ability of the paint films to release the dried inks from the dry erasable markers after the inks are left on the paint films for several days. Preferably, the combination of selected surfactants includes, but is not limited to, a fluoro surfactant and a Gemini surfactant. This combination of surfactants may also include hydrocarbon based surfactants or other conventional surfactants.

Fluoro surfactants generally comprise a polar hydrophilic head and a highly hydrophobic fluorocarbon tail. Fluoro surfactants are described in N. M. Kovalchuk et al., "*Fluoro- vs Hydrocarbon Surfactants: Why Do They Differ in Wetting Performances?*" in Advances in Colloid and Interface Science, 210 (2014) 65-71, which is incorporated herein by reference in its entirety. Fluoro surfactants significantly reduce the surface tension and the surface energy of the paint compositions, as well as the surface energy of the paint films formed by these paint compositions. Fluoro surfactants can reduce the surface tension and surface energy significantly more than conventional hydrocarbon surfactants.

To effectively wet a surface, the surface energy of liquid composition should be lower than the surface energy of the substrate. Fluoro surfactants at low concentrations, e.g., from about 0.01% to about 0.1% or up to 0.5% can lower the surface energy to below 20 dynes/cm and preferably lower than 18 dynes/cm. Conventional inks in the dry-erase markers generally comprise ethanol (about 22.27 dynes/cm surface energy) or isopropanol (about 21.70 dynes/cm surface energy) solvent, color pigments, a conventional surfactant as a release agent. Without being bound to any particular theory, the present inventors believe that as the dry erasable markers are dragged across the paint films, the solvent's relative high surface energy relative to the surface energy of the paint film prevents the inks from fully wet the paint film, and as the solvent evaporates the residual ink's conventional surfactants would have higher surface energy than the surface energy of the paint film's fluoro surfactant thereby not allowing the residual ink to fully wet the paint film. This allows the residual inks to be readily removed from the paint film formed by the inventive dry erasable paint compositions.

Suitable fluoro surfactants include the Capstone® FS-## family of fluoro surfactants commercially available from DuPont, SURFLON® fluoro surfactants commercially available from AGC Seimi Chemical Co., Ltd., and the FC-## fluoro surfactants from 3M.

Gemini surfactants possess more than one group of hydrophobic tail and hydrophilic head. These surfactants are described in S. K. Hait et al, "*Gemini Surfactants: A Distinct Class of Self-Assembling Molecules*," Current Science, Vol. 82, No. 9, 10 May 2002, which is incorporated herein by reference in its entirety. Gemini surfactants generally have a sequence of a long hydrocarbon (hydrophobic) chain, an ionic (hydrophilic) group, a spacer, a second ionic group and a second hydrocarbon chain. Short or long methylene groups, rigid (stilbene), polar (polyether), and nonpolar (aliphatic, aromatic) groups may be used as spacers. Most Gemini surfactants are symmetrical about the spacer. Suitable Gemini surfactants include, but are not limited to, siloxane-based Gemini surfactants or organically modified siloxane-based Gemini surfactants, commercially available as TEGO® Twin surfactants from Tego Chemie Services GmbH. Gemini surfactants also contribute to low foaming of the paint composition.

The present inventors have discovered that the inventive writable, dry erasable paint compositions function better when the fluoro surfactants are complimented with the Gemini surfactants, as shown in the Examples below. More specifically, when these two surfactants are used with a defoamer, the dried inks from dry-erase markers left more than 3 days on the paint films formed from the inventive paint compositions can be erased or removed by dry cloths more readily than on paint films formed by the paint compositions with only the fluoro surfactants.

These fluoro surfactant(s) and the Gemini surfactant(s) in the inventive paint compositions are in addition to any surfactants that were used to polymerize the resins used in the inventive writable, dry erasable paint compositions.

In one embodiment, the cure part comprises at least a mono-functional aminosilane and a multi-functional aminosilane, which has at least two functional groups. Preferably, one functional group is reactive with organic material, such as epoxy, amino, vinyl, methacryloxy, acryloxy, mercapto, styryl, among others, and the other functional group is reactive with inorganic material or possibly another organic material.

Suitable aminosilanes include but are not limited to 1-propanamine,3-(trimethoxysilyl)-N-[3-trimethoxysilyl-propyl], bis(trimethoxysilylpropyl)amine, 2-aminoethyl-3-aminopropyltrimethoxysilane (also referred to as "DAMO"), n-butylaminopropyltrimethoxysilane, and n-ethylaminoisobutylrtimethoxysilane.@@bis(triethoxysilylpropyl)tetrasulfide, bis(triethoxysilylpropyl)disulfide, 3-aminopropyltrimethoxysilane, 3-aminopropylmethyldiethoxysilane, aminoethylaminopropyltrimethoxysilane, aminoethylaminopropylmethyldimethoxysilane, (n-phenylamino)methyltrimethoxysilane, (n-phenylamino)methyltriethoxysilane, diethylaminomethyltriethoxysilane, 3-mercaptopropyltrimethoxysilane, 3-mercaptopropyltriethoxysilane, 3-mercaptopropylmethyldimethoxysilane, 3-ureidopropyltriethoxysilane, 3-thiocyanatopropyltriethoxysilane, 3-isocyanatepropyltriethoxysilane, 3-glycidoxypropyltrimethoxysilane, 3-methacryloxypropyltrimethoxysilane, vinyltrimethoxysilane, vinyltriethoxysilane, and vinyltris(2-methoxyethoxy) silane.

Exemplary multi-functional aminosilane include but are not limited to 1-propanamine,3-(trimethoxysilyl)-N-[3-trimethoxysilylpropyl], bis(trimethoxysilylpropyl)amine, 2-aminoethyl-3-aminopropyltrimethoxysilane (also referred to as "DAMO"), n-butylaminopropyltrimethoxysilane, and n-ethylaminoisobutylrtimethoxysilane. Multi-functional aminosilanes are also discussed in U.S. Pat. No. 6,132,808, and U.S. patent application publication no. 2014/0272155, which are incorporated herein by reference in its entirety. Multi-functional aminosilanes are commercially available as CiCiB® silanes, Dynasylan™ from Evonik Industries, among others. Preferred multi-functional aminosilanes include 1-propanamine,3-(trimethoxysilyl)-N-[3-trimethoxysilylpropyl], which is commercially available as Silquest™ A-1170, Silquest™ Y-9627 and Silquest™ Y-11699 available from Momentive Performance Materials, Inc. and Dynasylan™ 1124 from Evonik Industries.

Mono-functional aminosilanes have a single functional group. Suitable mono-functional aminosilanes include, but are not limited to, 3-aminopropyltriethoxysilane, available as Silquest™ A-1100, and 3-aminopropyltrimethoxysilane. Any mono-functional aminosilane can be used in the inventive formulation.

Preferably, the epoxy resin part comprises an epoxy-silicone resin that is substantially free of isocyanate that is crosslinked by an amine or amino-silane cross-linker contained in the cure part, when the two parts are mixed and applied on the substrate. Suitable epoxy resins are commercially available as EPOSIL™ Resin 5550 and its predecessor, resin RSL-4479, from Hexion Specialty Chemicals, Inc. The resin part may include an opacifying pigment, such as $TiO_2$ or another white pigment, to produce a white writable, dry erasable paint film. As discussed above, the opacifying pigment can be omitted to produce a clear writable, dry erasable paint film, so that the paint color beneath the paint film provides the color background.

Defoamers are included to minimize bubble formation in the paint composition and when the paint composition is being rolled or brushed onto the substrate in order provide a smooth paint film surface for writing and to minimize texture caused by bubbles on the paint film. Any defoamers can be used. Suitable defoamers include but are not limited to, polysiloxane-polyether copolymers such as those sold by Tego under the tradenames Foamex™ and Airex™, those sold under the tradename BYK™, those sold under the tradename Drewplus™, those sold under the tradename Surfynol™, and the like, and combinations thereof. Preferred defoamers include an organo modified polysilane containing fumed silica sold under the tradename Tego Airex™ 900 and a silicone-free air releasable defoamer (1-methoxy-2-propanol acetate) under the tradename BYK™ A-501.

Preferably, the inventive paint compositions have an amino to epoxy equivalent weight ratio from about 0.30 to about 0.65. Preferably, the lower and upper ranges of amino to epoxy equivalent weight ratios can be in increments of 0.05 anywhere between 0.30 to 0.65 inclusive of the end points. For example, from about 0.35 to 0.60 or from about 0.50 to about 0.55 or from about 0.30 to about 0.35, etc. In other words, the lower and upper ranges of amino to epoxy equivalent weight ratios can float anywhere from about 0.30 to about 0.65 inclusively by an increment of 0.05.

Preferably, the amino to epoxy equivalent weight ratios range from about 0.30 to about 0.65, more preferably from about 0.40 to about 0.60 and more preferably from about 0.45 to about 0.55.

There are multiple definitions of equivalent weights. One formal, generic definition is "Equivalent weight, in chemistry, is the quantity of a substance that exactly reacts with, or is equal to the combining value of, an arbitrarily fixed quantity of another substance in a particular reaction." (http://www.britannica.com/science/equivalent-weight). Equivalent weight for an element or a radical is also defined as its atomic weight or formula weight divided by the valence it assumes in compounds. (Id. and http://encyclopedia2.thefreedictionary.com/equivalent+weight.)

More specifically, epoxide equivalent weight is defined as the amount of epoxide in grams which is equivalent to one mole of monoepoxy compound and amino equivalent weight is defined as the amount of basic polyamide which is equivalent to one mole of monoamine compound, as defined by U.S. Pat. No. 3,647,728 to Deflorin et al. from col. 1, line 72 to col. 2, line 6. The Deflorin reference is instructive because it teaches both epoxy and amine equivalent weights and how to calculate equivalent ratios. Within its multiple examples, Deflorin teaches that Equivalent=mass of an amine or epoxide compound (grams)/amine or epoxide equivalent weight (grams/mole)

Hence, an amine equivalent and an epoxide equivalent can be readily calculated if the weight amount of each component is known and the equivalent weights are known. The Deflorin reference is incorporated herein by reference in its entirety.

The inventive writable, dry erasable paint compositions in one embodiment may include opacifying pigments. In another embodiment, the paint compositions do not contain opacifying pigments and are clear paint compositions. The inventive paint compositions may contain one or more extender pigments.

Example 1

| Part A. Epoxy Resin Part - Clear | |
| --- | --- |
| Epoxy Resin | 98.1% |
| Defoamer (organo modified polysilane containing fumed silica) | 0.11% |
| Fluoro nonionic surfactant | 0.04% |
| Organically modified siloxane gemini surfactant | 0.29% |
| Fumed silica treated w/dimethyldichlorosilane≠ | 1.46% |
| | 100% |
| Part A. Epoxy Resin Part - with Opacifying Pigment | |
| Epoxy Resin | 67.2% |
| Defoamer (organo modified polysilane containing fumed silica) | 0.39% |
| Fluoro nonionic surfactant | 0.055% |
| Organically modified siloxane gemini surfactant | 0.33% |
| Fumed silica treated w/dimethyldichlorosilane | 1.11% |
| Opacifying pigment | 31.0% |
| | 100% |
| Part B. Aminosilane Cure Part | |
| 3-aminopropyltriethoxysilane | 55.29% |
| 1-propanamine,3-(trimethoxysilyl)-N-[3-trimethoxysilylpropyl] | 40.87% |
| Dibutyltin dilaurate (DBTDL) catalyst | 3.85% |
| | 100% |

≠incorporated to increase viscosity to control sag.
All percentages in all examples are weight percentages.

Either Part A (clear) or Part A (pigmented) was mixed with Part B and the properties and performance of the inventive writable, dry erasable paint compositions were tested with conventional premium writable, dry erasable paint compositions, as shown in the Tables 1 and 2 below.

TABLE 1

| Properties | Conv. Clear Resin (Part A) | Inventive Clear Resin (Part A) | Conv. Pigmented Resin (Part A) | Inventive Pigmented Resin (Part A) | Conv. Cure (Part B) | | Inventive Cure (Part B) |
| --- | --- | --- | --- | --- | --- | --- | --- |
| | | | | | Clr. | Pig. | |
| Weight lbs./gal. | 9.43 | 9.36 | 12.91 | 11.96 | 7.78 | 8.07 | 8.22 |
| Viscosity KU | 67 | 76.4 | 109.2 | 104.6 | | | |
| Viscosity (sec.) (EZZahn #2) | | | | | 16 | 16 | 15.7 |

TABLE 2

| Properties | Conventional Clear Paint | Inventive Clear Paint | Conventional Pigmented Paint | Inventive Pigmented Paint |
|---|---|---|---|---|
| Part A/Part B (wt.) | 2.2 | 2.92 | 2.52 | 3.0 |
| Gloss @ 60° | 80 | 85+ | 85+ | 85+ |
| Dry time (STT§ hours) | 1.5 | 175 | 2 | 1.5 |
| Dry time (hours) | 4 | 2.75 | 4.5 | 4 |
| Dry time to recoat | | 16 | | 16 |
| Contact Angle | | | 93.4 | 87.4 |
| Scrub test (ASTM 2486)≠ | Passed | Passed | Passed | Passed |
| Adhesion test | Passed | Passed | Passed | Passed |
| Washability: | | | | |
| Dry erasable markers | Passed | Passed | Passed | Passed |
| Household stains | Passed | Passed | Passed | Passed |
| Method of Application: | | | | |
| Conv. roller | Passed | Passed | Passed | Passed |
| 5/16 inch roller | Show bubbles | Passed | Show bubbles | Passed |
| Brush | Passed | Passed | Passed | Passed |
| Types of Marker | | | | |
| EXPO ® brand | +++++ | +++++ | +++++ | +++++ |
| Staples ® brand | ++++ | ++++ | ++++ | ++++ |

≠2000+ cycles resulting in a loss of gloss due to the abrasiveness of the medium.
§STT means "set to touch" or films that are dry to the touch and is no longer sticky.

The inventive paint compositions can coat a number of substrates, including but not limited to cold rolled steel, plastic (with optional light sanding), Formica, glass, aluminum, painted metal door, water based primer, water based satin and semi-gloss, alkyd based high gloss enamel, and chalk board paint (black)

The inventive paint formulations from Example 1 were applied alongside the same conventional premium paints on 5 different areas on walls in the present inventors' offices in Flanders, N.J. on Apr. 1, 2016. Staples® and EXPO® dry erasable markers (Red, Blue & Black colors) were used in drawing lines after a 7-day cure period on Apr. 8, 2016. The drawing lines were erased in section periodically during a 33-day period. The results are shown below.

Following table contains the ratings 10/10 (Pass) reducing to 1/1 (Fail) for cleaning the markings or drawing lines. Cleaning were more difficult as more days passed; however, even at 2/2 rating it was possible to clean with towel and cleaning solution to completely clean surface that can be used for writing on it once again. In the #/# results in the Table 3 below, the first number shows rating for Staples® dry erasable markers and second number after "/" shows rating of EXPO® dry erasable markers.

TABLE 3

| Elapsed Time | Conventional Clear Paint | Inventive Clear Paint | Conventional Pigmented Paint | Inventive Pigmented Paint |
|---|---|---|---|---|
| 6 hours | 9/9 | 9/9 | 9/9 | 9/9 |
| 3 days | 8/9 | 8/9 | 8/9 | 8/9 |
| 10 days | 5/7 | 5/7 | 5/8 | 5/8 |
| 21 days | 4/4 | 4/4 | 4/5 | 4/5 |
| 33 days | 3/4 | 3/4 | 4/5 | 4/5 |

For the 33-day testing period, the conventional and inventive writable, dry erasable paints perform similarly with both brands of dry erasable markers. The markings were erasable after 33 days with a dry towel or eraser.

The paint adhesion test discussed above is often used to determine whether the paint would adhere properly to the substrates. Three different tests can be used: cross-cut test, scrape adhesion, and pull-off test according to ASTM D2197-98, ASTM D4541-09e1, and ASTM D3359. Any paint adhesion test can be used.

Example 2: (Weight Percentages are for Mixtures of Part A and Part B)

Part A. Epoxy Resin Part - Clear

| | |
|---|---|
| Epoxy Resin | 72.6% |
| Defoamer (organo modified polysilane containing fumed silica) | 0.27% |
| Fluoro nonionic surfactant | 0.033% |
| Organically modified siloxane gemini surfactant | 0.22% |
| Fumed silica treated w/ dimethyldichlorosilane≠ | 1.1% |
| Fillers/extenders | 2.2% |

Part B. Aminosilane Cure Part

| | |
|---|---|
| 3-aminopropyltriethoxysilane | 13.01% |
| 1-propanamine,3-(trimethoxysilyl-N-[3-trimethoxysitylpropyl] | 9.61% |
| Dibutyltin dilaurate (DBTDL) catalyst | 0.94% |
| | 100% |

Part A. Epoxy Resin Part - with Opacifying Pigment

| | |
|---|---|
| Epoxy Resin | 55.3% |
| Defoamer (organo modified polysilane containing fumed silica) | 0.317% |
| Fluoro nonionic surfactant | 0.05% |
| Organically modified siloxane gemini surfactant | 0.27% |
| Fumed silica treated w/ dimethyldichlorosilane≠ | 0.91% |
| Opacifying pigment | 25.3% |

Part B. Aminosilane Cure Part

| | |
|---|---|
| 3-aminopropyltriethoxysilane | 10.0% |
| 1-propanamine,3-(trimethoxysilyi)-N-[3-trimethoxysilylpropyl] | 7.37% |
| Dibutyltin ditaurate (DBTDL) catalyst | 0.73% |
| | 100% |

Example 3

Part A. Epoxy Resin Part - Clear

| | |
|---|---|
| Epoxy Resin | 98.01% |
| Defoamer (organ modified polysilane containing fumed silica) | 0.109% |
| Fluoro nonionic surfactant | 0.044% |
| Organically modified siloxane gemini surfactant | 0.291% |
| Fumed silica treated w/ dimethyldichlorosilane≠ | 1.457% |
| Fillers/extenders | —% |
| | 100% |

Part B. Aminosilane Cure Part

| | |
|---|---|
| 3-aminopropyltriethoxysilane | 55.288% |
| 1-propanamino,3-(trimethoxysilyl)-N-[3-trimethoxysilylpropyl] | 40.865% |
| Dibutyltin dilaurate (DBTDL) catalyst | 3.846% |
| | 100% |

Part A. Epoxy Resin Part - with Opacifying Pigment

| | |
|---|---|
| Epoxy Resin | 67.156% |
| Defoamer (organo modified polysilanc containing fumed silica) | 0.387% |
| Fluoro nonionic surfactant | 0.055% |

| | |
|---|---|
| Organically modified siloxane gemini surfactant | 0.332% |
| Fumed silica treated w/ dimethyldichlorosilane≠ | 1.106% |
| Opacifying pigment | 30.964% |
| | 100% |
| Part B. Aminosilane Cure Part | |
| 3-aminopropyltriethoxysilane | 55.288% |
| 1-propanamine,3-(trimethoxysilyl)-N-[3-trimethoxysilylpropyl] | 40.865% |
| Dibutyltin ditaurate (DBTDL) catalyst | 3.846% |
| | 100% |

In Example 3, the ratio (by weight) between Part A (clear) and Part B is about 77:23 and the ratio (by weigh) between Part A (white) and Part B is about 82:18. The ratio by volume is about 3:1 for both the Part A (clear and the white) to Part B. The performances of the inventive paint compositions in Examples 2 and 3 are comparable to those in Example 1.

The weight percentages of fluoro surfactant to the resin part are 0.04% and 0.055% (Example 1), 0.043% and 0.061% (Example 2) and 0.043% and 0.055% (Example 3). The fluoro surfactant may range from about 0.02 wt. % to about 0.075 wt. % of the resin part, preferably from about 0.03 wt. % to about 0.070 wt. % and preferably from about 0.035 wt. % to about 0.065 wt. %.

The weight percentages of Gemini surfactant to the resin part are 0.29% and 0.33% (Example 1), 0.29% and 0.33% (Example 2) and 0.29% and 0.33% (Example 3). The Gemini surfactant may range from about 0.2 wt. % to about 0.5 wt. % of the resin part, preferably from about 0.25 wt. % to about 0.40 wt. % and preferably from about 0.30 wt. % to about 0.35 wt. %.

In the Examples 1-3 discussed above, the epoxide equivalent weight of the epoxy resin is about 420-440 g/eq. The amine equivalent weight for the mono-functional aminosilane is about 89.7 and the amine equivalent weight for the multi-functional aminosilane is about 342.1. The composite amine equivalent weight based on the relative amounts present in the cure part is about 200. Hence, the amino to epoxy equivalent weight ratio of the inventive paint composition is about 0.476 to about 0.4545.

As discussed above, best performances for the inventive writable, dry erasable paint films made from the inventive paint compositions, as illustrated in Examples 1-3, are obtained when both the fluoro surfactant and the Gemini surfactant are included in either the resin part or in the cure part, or in both. As shown below in Comparative Examples A and B, composition A is prepared without the fluoro surfactant and without the Gemini surfactant, and composition B is prepared with only the fluoro surfactant.

Comparative Example A

| Part A. Epoxy Resin Part - Clear | |
|---|---|
| Epoxy Resin | 78.472% |
| Defoamer (1-metboxy-2-propanol acetate) | 0.213% |
| Fluoro nonionic surfactant | —% |
| Organically modified siloxane gemini surfactant | —% |
| Fumed silica treated w/ dimethyldichlorosilane≠ | —% |
| Fillers/extenders | —% |
| Part B. Aminosilane Cure Part | |
| 3-aminopropyltriethoxysilane | 12.656% |
| 1-propanamine,3-(trimethoxysilyi)-N-[3-trimethoxysilylpropyl] | 7.771% |
| Dibutyltin ditaurate (DBTDL) catalyst | 0.888% |
| | 100% |

Comparative Example B

| Part A. Epoxy Resin Part - Clear | |
|---|---|
| Epoxy Resin | 78.953% |
| Defoamer (1-methoxy-2-propanol acetate) | 0.284% |
| Organically modified siloxane gemini surfactant | —% |
| Fumed silica treated w/ dimethyldichlorosilane≠ | —% |
| Fillers/extenders | —% |
| Part B. Aminosilane Cure Part | |
| 3-aminopropyltriethoxysilane | 6.090% |
| 1-propanamine,3-(trimethoxysity1)-N-[3-trimethoxysilylpropyl] | 14.617% |
| Fluoro nonionic surfactant | 0.055% |
| | 100% |

The amino to epoxy equivalent weight ratio in Comparative Example A is about 0.432 and in Comparative Example B is about 0.623.

The present inventors discovered that when dried inks from the dry erasable markers are left on the paint film formed from Comparative Examples A and B for three days, it is difficult to remove the dried inks with a dry cloth or a wet cloth. This shows the ability of the fluoro surfactant and the Gemini surfactant to release the dried inks from the inventive paint films.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A writable, dry erasable paint composition comprising an epoxy resin part and a cure part comprising at least one aminosilane, wherein the epoxy resin part and the cure part are admixed to form the writable, dry erasable paint composition,
   wherein the paint composition further comprises a fluoro surfactant and a Gemini surfactant.

2. The writable, dry erasable paint composition of claim 1, wherein the cure part comprises a mono-functional amino-silane and a multi-functional aminosilane.

3. The writable, dry erasable paint composition of claim 1, wherein the fluoro surfactant comprises a fluoro nonionic surfactant.

4. The writable, dry erasable paint composition of claim 1, wherein the Gemini surfactant comprises a siloxane Gemini surfactant.

5. The writable, dry erasable paint composition of claim 4, wherein the Gemini surfactant comprises an organically modified siloxane Gemini surfactant.

6. The writable, dry erasable paint composition of claim 1, wherein the fluoro surfactant is admixed in the resin part or in the cure part.

7. The writable, dry erasable paint composition of claim 1, wherein the Gemini surfactant is admixed in the resin part or in the cure part.

8. The writable, dry erasable paint composition of claim 1, wherein the fluoro surfactant ranges from about 0.02 wt. % to about 0.075 wt. % of the resin part.

9. The writable, dry erasable paint composition of claim 8, wherein the fluoro surfactant ranges from about 0.03 wt. % to about 0.070 wt. % of the resin part.

10. The writable, dry erasable paint composition of claim 9, wherein the fluoro surfactant ranges from about 0.035 wt. % to about 0.065 wt. % of the resin part.

11. The writable, dry erasable paint composition of claim 1, wherein the Gemini surfactant ranges from about 0.2 wt. % to about 0.5 wt. % of the resin part.

12. The writable, dry erasable paint composition of claim 11, wherein the Gemini surfactant ranges from about 0.25 wt. % to about 0.40 wt. % of the resin part.

13. The writable, dry erasable paint composition of claim 12, wherein the Gemini surfactant ranges from about 0.30 wt. % to about 0.35 wt. % of the resin part.

14. The writable, dry erasable paint composition of claim 1 further comprising a defoamer.

15. The writable, dry erasable paint composition of claim 14, wherein the defoamer comprises an organo modified polysilane.

16. The writable, dry erasable paint composition of claim 14, wherein the defoamer comprises 1-methoxy-2-propanol acetate.

* * * * *